Oct. 2, 1923.  
J. A. McAVOY  
1,469,229  
AUTO WINDOW FRAME  
Filed April 19, 1919
Fig. 1.
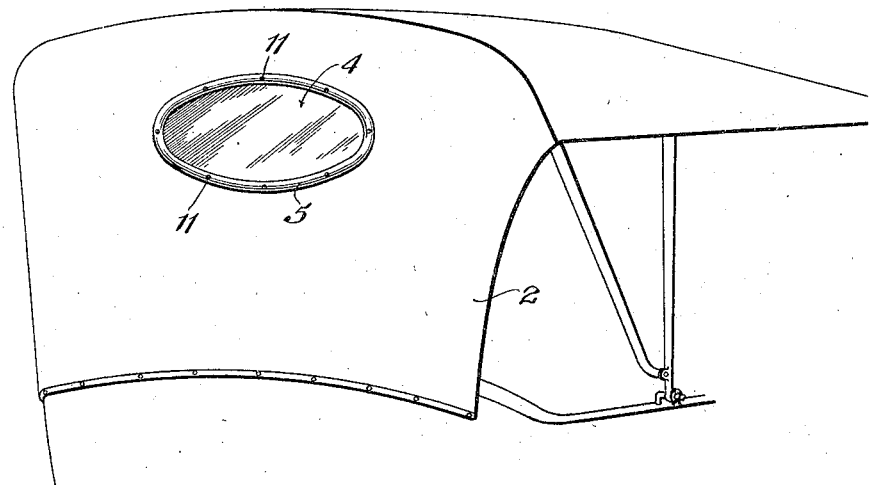
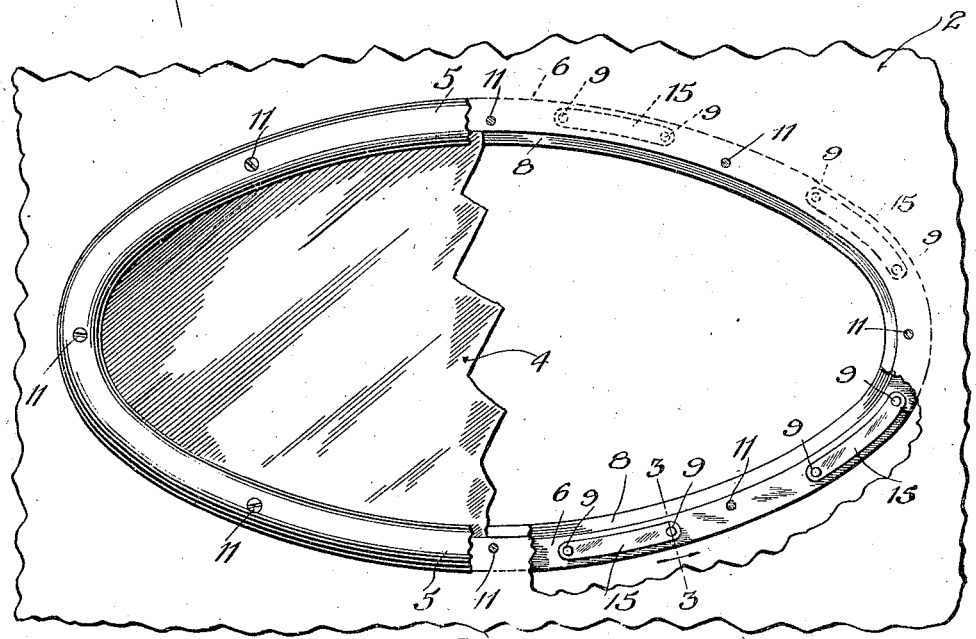
Fig. 2.
Fig. 3.
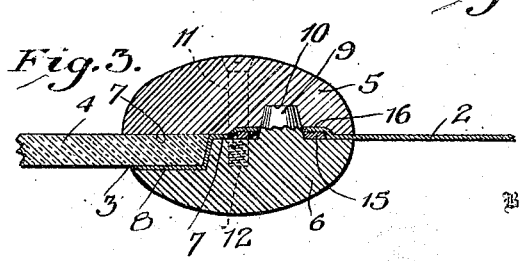
Inventor  
John A. McAvoy  
By Mason Fenwick Lawrence,  
Attorneys Patented Oct. 2, 1923.

1,469,229

UNITED STATES PATENT OFFICE.

JOHN A. McAVOY, OF CHICAGO, ILLINOIS, ASSIGNOR, BY MESNE ASSIGNMENTS, TO STEWART MANUFACTURING CORPORATION, OF WILMINGTON, DELAWARE, A CORPORATION OF DELAWARE.

AUTO WINDOW FRAME.

Application filed April 19, 1919. Serial No. 291,419.

*To all whom it may concern:*

Be it known that JOHN A. McAVOY, a citizen of the United States, residing at the city of Chicago, in the county of Cook and State of Illinois, has invented certain new and useful Improvements in Auto Window Frames; and he does hereby declare the following to be a full, clear, and exact description of the invention, such as will enable others skilled in the art to which it appertains to make and use the same.

This invention relates to window construction and more particularly to means for mounting window panes in fabric material or pliant sheet, such for instance as the side of a vehicle top or curtains of motor launches and various other structures.

It is one of the objects of the invention to provide a simple, practicable, easily applied and inexpensive device whereby a window pane such for instance as a piece of glass, may be neatly, readily and quickly installed in a piece of pliant material, such as a curtain or other draping sheet.

Another object of the present invention is to provide a device of this type which is so designed and constructed that it will eliminate the wrinkling of the pliant sheet, so as to keep it smooth and attractive in appearance and to further utilize a portion of the pliant sheet as a packing or bedding on which the pane of glass for instance, may be secured when the frame or fastening device is attached to the curtain or other part.

With these and other objects in view as will become manifest to those versed in the art, the invention consists of the construction, the combination, and in details and arrangements of the parts as more particularly described in the following specification relative to the embodiment of the invention, illustrated in the accompanying drawings, in which, Figure 1 is a perspective view of the rear of an automobile top, showing the frame in place holding a sheet of glass.

Figure 2 is an enlarged plan view showing certain parts broken away for the purpose of clearness, and, Figure 3 is a transverse sectional view of line 3—3 of Figure 2.

The curtain or other part indicated at 2 to which the window is to be applied is provided with an opening indicated at 3 of a size somewhat less than the size of one plane or surface of the glass or other panel or pane indicated at 4, so that the pane will overlap a marginal portion of the pliant sheet or side 2. The device for securing the glass or pane in place comprises a frame structure which consists of two substantially similarly shaped frame sections 5 and 6, having substantially plane meeting surfaces 7, the inner marginal portion of the section 6 being rabbeted as at 8 to form a seat to receive the marginal portion and edge of the pane of glass 4 and also allow for the embedding or folding down of the adjacent portion of the pliant material 2 so that the edge of the pane of glass 4 and the marginal portion of one surface thereof rests upon a packing formed by the downwardly folded and laid marginal portion of the pliant sheet or side 2. To secure the proper registration of the sections of the frame 5 and 6, suitable dowel or other means may be employed shown as comprising a dowel pin 9 adapted to enter a dowel socket 10, it being understood that a suitable number of the dowel pins and the sockets are employed and spaced at suitable intervals along the plane surface of the frame section. These sections are designed to be secured or fastened together to embrace between their meeting faces the interposed portion of the side or sheet 2 by any suitable means as for instance screws 11 having countersunk heads as for instance in the frame section 5 and each engaging respectively a threaded hole 12 in the opposite section 6.

One of the features of the present invention consists in means whereby the side or part 2 is maintained smooth and flat and wrinkling is eliminated so as to make an attractive appearance for the curtain and also for the window frame. To secure this object of overcoming the wrinkling a suitable drawing means is employed and in the form illustrated comprises a series of washers or elevated parts or members 15 in form of elongated and narrow plates perforated at their ends so that each plate will pass over two adjacent dowel pins 9 which will pass through apertures provided therefor in the marginal portion of the sheet 2 around the opening 3 therein. When the frame sections 5 and 6 are brought into meeting relation the elevated portions or washers 15 are designed to enter recesses 16 formed in the plane meeting surface at 7 of the section 5 and thus draw the material to take up slack and eliminate wrinkles. In stretching the sheet, 2, from all directions toward the opening, 3, the marginal portion of this opening tends to become somewhat elongated so that it will not lie perfectly flat but makes a rippled or corrugated surface or at least would tend to bulge out of its proper plane; however, by pressing this marginal portion of the fabric into the recesses, 16, its excessive area produced by the stretching or tensioning is absorbed by the depth of the recesses added to their length, and the result is a smoothly stretched curtain supporting the window frame and the glass pane therein.

Obviously the frame structure can be constructed of any suitable material and of any size and desired form and can be quickly applied to effectually secure the window or pane 4 in place and at the same time make a very ornamental and attractive finish for the curtain or other part in which the window is mounted.

I claim:

1. In combination with a window opening in a curtain of pliant material, a relatively rigid frame comprising two sections of similar contour, secured together with the curtain material clamped between them, one of said frame members having recesses at certain positions and the other member having up-raised portions adapted to press the pliant material into said recesses for taking up slack; one of said frame sections being provided with dowels and the other section having recesses to receive them for positioning said frames in proper relation, and the upraised portions carried by one frame member, being in the form of washers or plates apertured and carried on said dowels.

2. In combination with a window opening in a curtain of pliant material, a relatively rigid frame comprising two sections of similar contour, secured together with the curtain material clamped between them, one of said frame members having recesses at certain positions and the other member having up-raised portions adapted to press the pliant material into said recesses for taking up slack; one of said frame members having dowels projecting at intervals from its clamping face and the other member having recesses to receive them for proper positioning of the frames; and the upraised portions carried by one frame member comprising elongated plates apertured and carried upon two adjacent dowels.

In testimony whereof he affixes his signature.

JOHN A. McAVOY.